United States Patent [19]

Kitagawa et al.

[11] Patent Number: 5,324,070
[45] Date of Patent: Jun. 28, 1994

[54] AIR BAG DEVICE FOR A KNEE OF AN OCCUPANT

[75] Inventors: Motonobu Kitagawa; Akira Kokeguchi; Misao Kamiyama; Tadayuki Atoh, all of Shiga, Japan

[73] Assignee: Takata Corporation, Tokyo, Japan

[21] Appl. No.: 5,051

[22] Filed: Jan. 15, 1993

[30] Foreign Application Priority Data

Jan. 31, 1992 [JP] Japan .................. 4-016359
Jan. 31, 1992 [JP] Japan .................. 4-016360

[51] Int. Cl.⁵ .............................. B60R 21/22
[52] U.S. Cl. .................. 280/730 R; 280/743 R; 280/752; 280/753
[58] Field of Search ........... 280/730 R, 752 R, 751 R, 280/732, 753, 728 R, 743 R

[56] References Cited

U.S. PATENT DOCUMENTS

| 4,004,828 | 1/1977 | Sogabe et al. | 280/743 R |
| 4,262,931 | 4/1981 | Strasser et al. | 280/729 |
| 4,351,544 | 9/1982 | Ross | 280/743 R |
| 5,022,676 | 6/1991 | Rogerson et al. | 280/743 R |
| 5,044,663 | 9/1991 | Seizert | 280/730 R |
| 5,090,729 | 2/1992 | Watanabe | 280/730 R |

FOREIGN PATENT DOCUMENTS

| 2030863 | 12/1971 | Fed. Rep. of Germany ... 280/743 R |
| 953312 | 3/1964 | United Kingdom. |
| 2250963 | 6/1992 | United Kingdom. |

*Primary Examiner*—Eric Culbreth
*Attorney, Agent, or Firm*—Kanesaka & Takeuchi

[57] ABSTRACT

An air bag device for a knee of an occupant includes an air bag adapted to be extended in front of a seat of a vehicle including a zone at a height of the seat, a casing which holds the air bag therein in a folded state, and a gas generator mounted on the casing, the casing being located in a position offset to one of the righthand and lefthand sides of the front of the center of the seat, and the air bag having such a volume as to be extended to the other side by the gas generator. An air bag device for a knee of an occupant includes an air bag adapted to be extended in front of a seat of a vehicle including a zone at a height of the seat, the air bag having a shape when it is extended fully, in which its two end sides in the widthwise direction of the seat have projections toward the seat.

4 Claims, 7 Drawing Sheets

AIR BAG DEVICE FOR A KNEE OF AN OCCUPANT

BACKGROUND OF THE INVENTION

1. Field of the Invention

The present invention relates to a device for protecting an occupant of a vehicle and, more particularly, to an air bag device for a knee of an occupant as called a "knee bag device".

2. Description of the Related Art

An occupant protecting device having an air bag (or a knee bag) to be extended in front of a knee of the occupant of a vehicle is disclosed in Japanese Utility Model Publication No. 24110/1991 and Japanese Patent Laid-Open No. 28050/1991. These knee bags can be extended to protect the lower half of the occupant by preventing the submarine motion of the occupant (i.e., the motion of the occupant's body moving into the front lower portion of the seat).

The occupant protecting devices, as known in the above-specified individual publications, have its air bag device arranged in front of the center of the seat. As a result, the air bag device is positioned near the knees of the occupant to raise a problem of deteriorating the comfortableness of the vehicle cabin. At a driver's seat, on the other hand, the steering column is located in the vicinity of the front of the seat center thereby to make it more difficult to arrange the air bag device.

In the knee bag device of the prior art, the air bag takes, when extended, a generally identical shape (i.e., the extended shape of the air bag) throughout the widthwise direction of the seat. With this extended shape, the occupant may have his or her legs opened, when his or her legs are advanced or pushed to the extended air bag. Namely, the right leg may slide rightwardly of the air bag whereas the left leg may slide leftwardly of the air bag so that the legs may be opened.

OBJECT AND SUMMARY OF THE INVENTION

According to a first aspect of the present invention, there is provided an air bag device for a knee of an occupant comprises an air bag adapted to be extended in front of a seat of a vehicle including a zone at a height of the seat, a casing which holds the air bag therein in a folded state, and a gas generator mounted on the casing, the casing being located in a position offset to one of the righthand and lefthand sides of the front of the center of the seat, and the air bag having such a volume as to be extended to the other side by the gas generator.

According to a second aspect of the present invention, the air bag of the first aspect has a transversely long expandable shape and is formed at its back at one transverse end with an opening to be connected with a gas generator, and wherein the air bag has its longer side upper and lower edges folded back to the front thereof and its transverse other end folded back toward the one transverse end.

Since the air bag device according to this invention is disposed in a position offset rightward or leftward from the front of the center of the seat, the distance from the knees of the occupant to the air bag can be enlarged to widen the space around the knees of the occupant.

According to the air bag device of the second aspect, the air bag can be quickly extended in the zone in front of the center of the seat.

According to a third aspect of the present invention, there is provided an air bag device for a knee of an occupant, comprises an air bag adapted to be extended in front of a seat of a vehicle including a zone at a height of the seat, a casing which holds the air bag therein in a folded state, and a gas generator mounted on the casing, the air bag having a shape when it is extended fully, in which its two end sides in the widthwise direction of the seat have projections toward the seat.

According to the air bag device of the third aspect, the air bag takes, when extended, a shape, in which its portion facing the center of the seat is recessed so as to receive the knees of the occupant thrown thereto. As a result, the occupant can prevent his or her legs from being opened.

DESCRIPTION OF THE PREFERRED EMBODIMENTS

The present invention will be described in the following in connection with the embodiments thereof with reference to the accompanying drawings.

Figure 1:
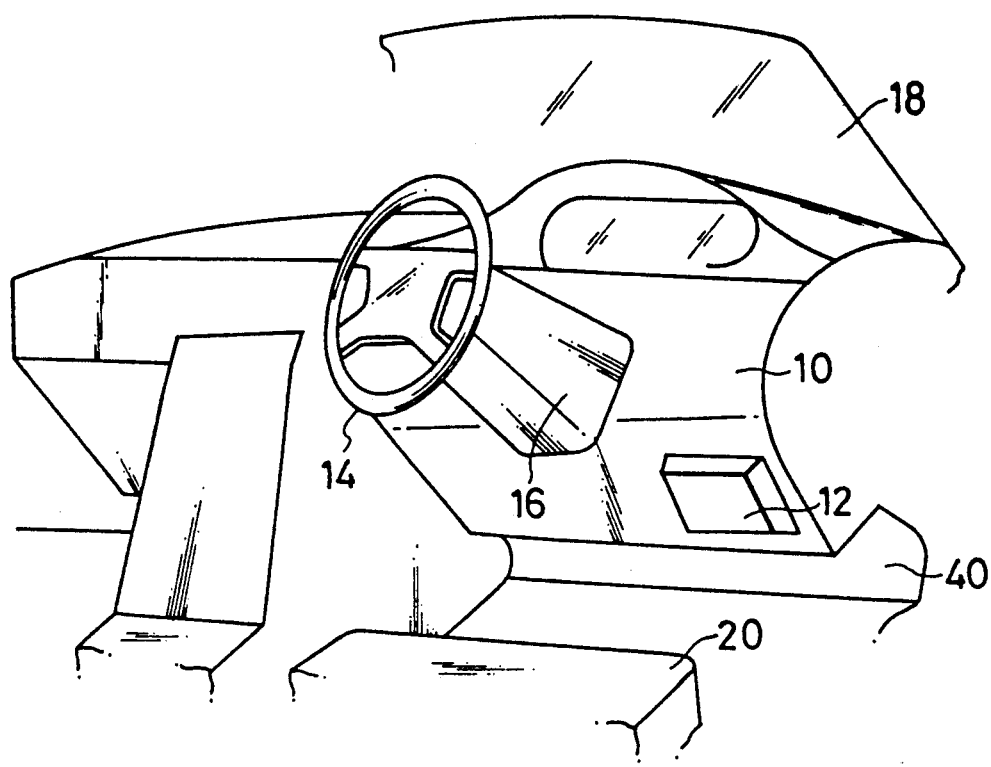
FIG. 1 is a perspective view of the inside of a vehicle and shows a device embodying the present invention.

In FIG. 1, an automobile is equipped with an air bag device 12 on the lower face of its instrument panel 10. A steering wheel 14, a cover 16 for a steering column, a front wheel 14, a cover 16 for a steering column, a front shield 18 and a driver's seat 20 are provided in a cabin of a vehicle. The steering wheel 14 and the steering column cover 16 are located in front of the center of the driver's seat 20. The air bag device 12 is offset rightward (as in the present embodiment) or leftward from the front of the seat center.

Figure 2:
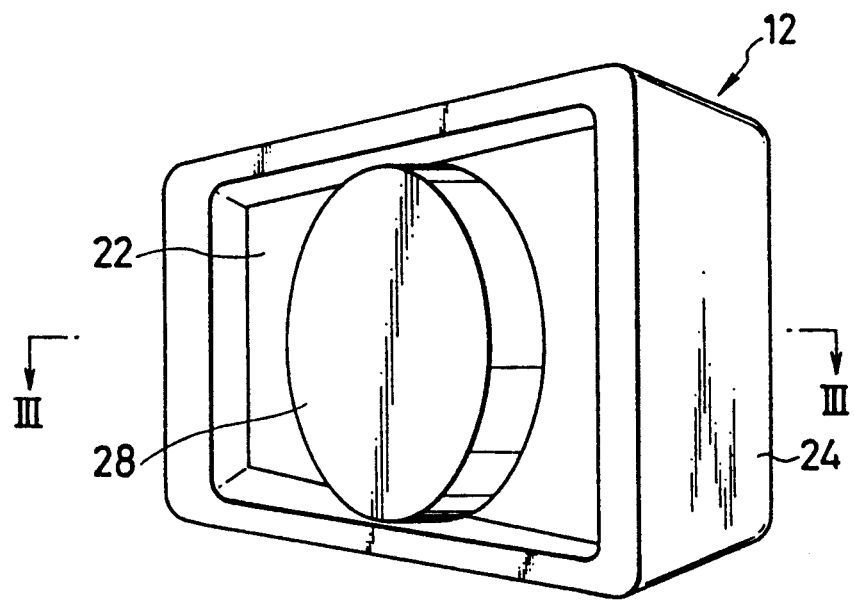
FIG. 2 is a perspective view showing the back of an air bag device to be used in the embodiment.
Figure 3:
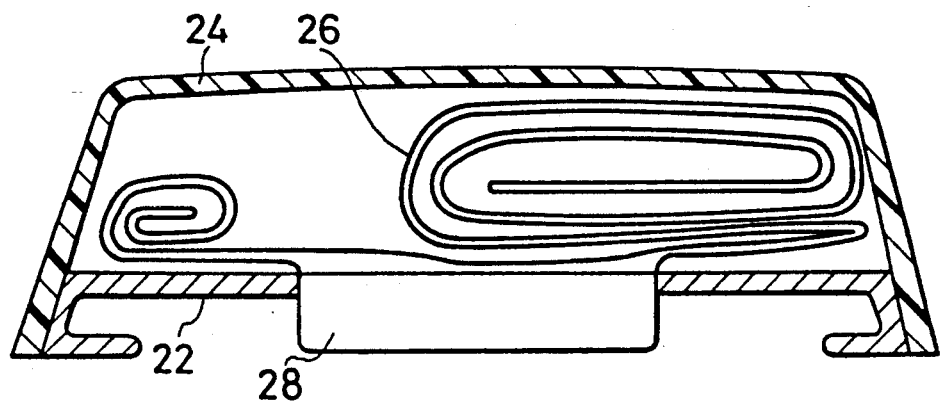
FIG. 3 is a section taken along line III—III of FIG. 2.
Figure 11:
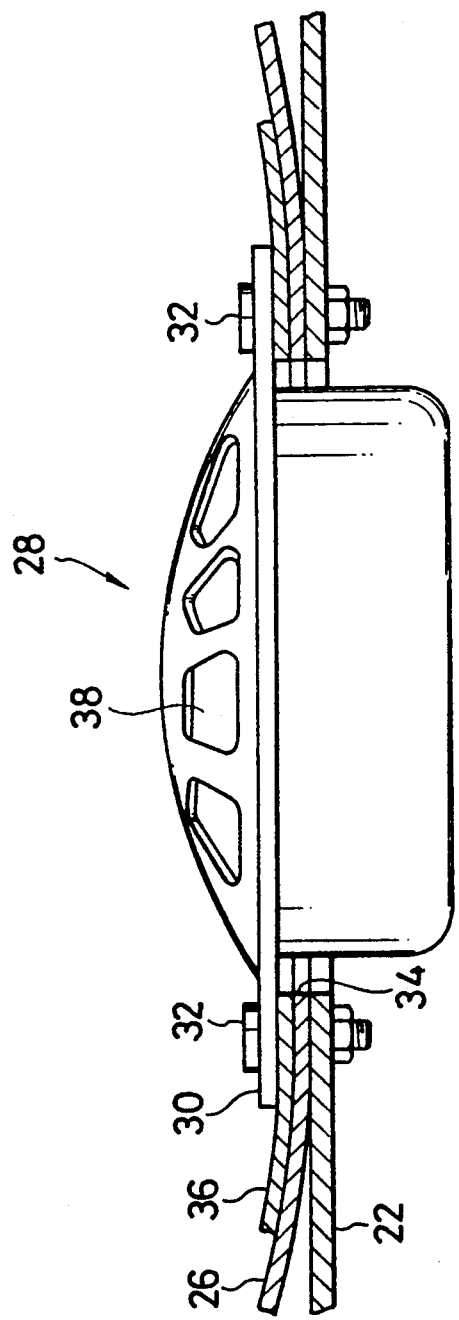
FIG. 11 is an enlarged section showing an essential portion of FIG. 3.

As shown in FIGS. 2, 3 and 11, the air bag device 12 comprises a casing having a retainer 22 and a module cover 24. An air bag 26 is arranged in a folded shape in the casing. The retainer 22 is provided with a gas generator 28 for extending the air bag 26.

The gas generator 28 has a flange 30 through which the gas generator 28 is fixed to the retainer 22 via bolts 32. The air bag 26 is fixed on the retainer 22 by having its opening 34 clamped at its edge portion between the flange 30 and the retainer 22. A reinforcing cloth 36 is stitched on the edge portion of the opening 34 of the air bag 26. The gas generator 28 has gas injection holes 38.

Figure 4:
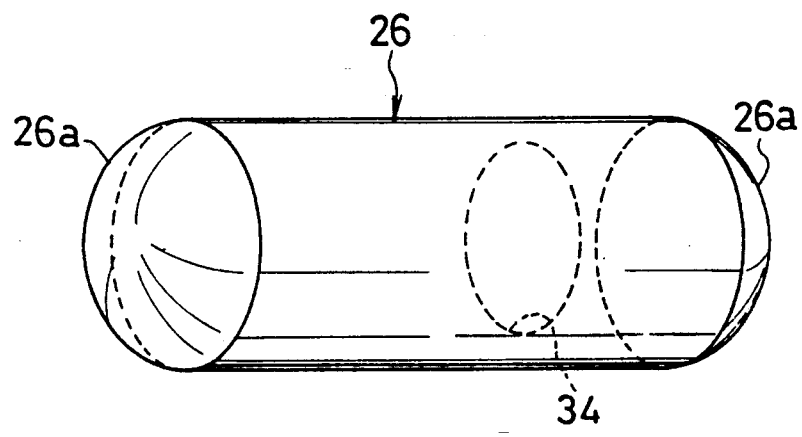
FIG. 4 is a perspective view for showing a fully expanded air bag.

The air bag 26 takes, when extended, a transversely long shape, as shown in FIG. 4, and the opening 34 is arranged in the back of one of the transverse ends of the air bag extended fully.

It will be explained in detail how the air bag 26 is folded with reference to FIGS. 4 to 10.

Figure 5:
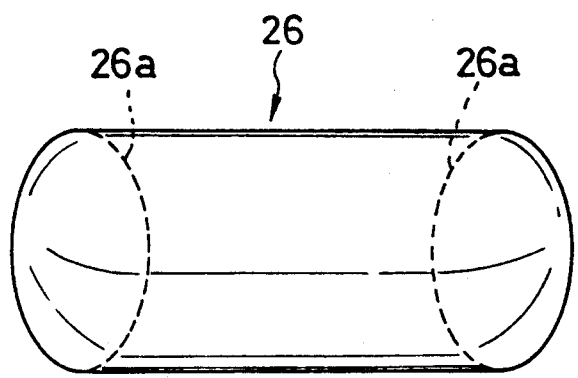
FIGS. 5–9 are explanatory views for showing the air bag, wherein the air bag is folded step by step.
Figure 6:
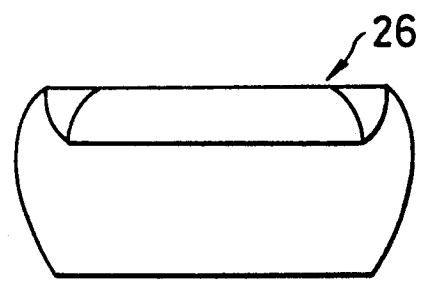
Figure 7:
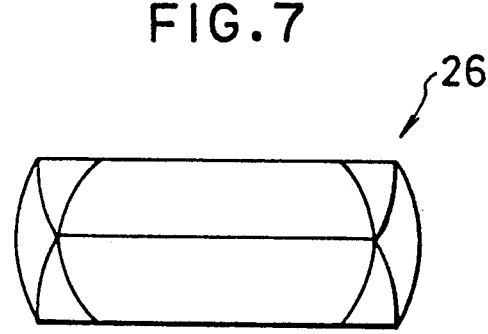
Figure 8:
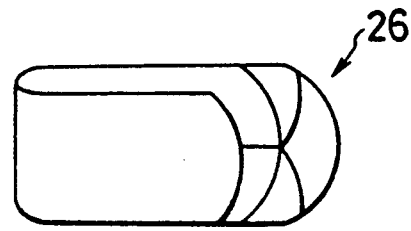
Figure 9:
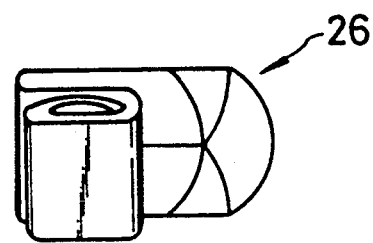
Figure 10:
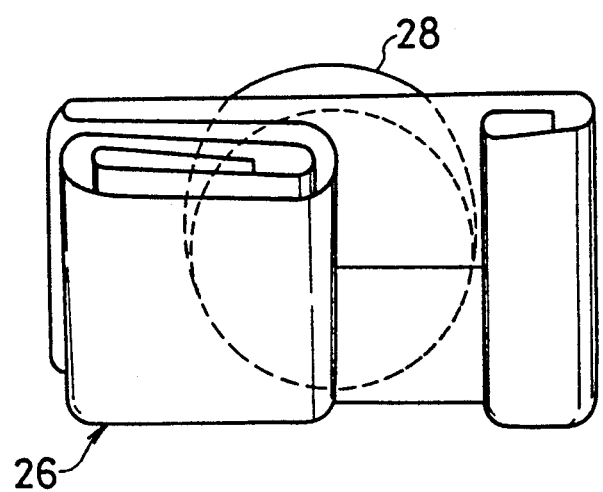
FIG. 10 is a perspective view showing a fully folded air bag.

First of all, projecting portions 26a at the two transverse ends of the air bag 26 are slightly folded inward, as shown in FIG. 5. Next, the air bag 26 has its one longer side folded back toward its surface side, as shown in FIG. 6. Then, the other longer side is folded back toward the surface side of the air bag 26, as shown in FIG. 7. As a result, the air bag 26 takes a transversely long shape in its entirety. Next, as shown in FIG. 8, the side opposite to the side formed with the opening 34 is folded back to the surface side of the air bag 26, and the leading end in the fold-back direction is folded several times such that it is wound in the same direction. As a result, a state of FIG. 9 is achieved. Thus, the transversely other end portion of the air bag 26 is then folded back toward the surface side of the air bag 26. As a result, the air bag 26 takes a compactly folded state, as shown in FIG. 10.

If the air bag 26 thus folded is confined in the casing, as shown in FIG. 3, it is quickly extended transversely when the gas generator 28 generates gases. As a result, even if the air bag device 12 is arranged in the position offset from the front of the seat center, the air bag 26 is extended quickly all over the front area of the knees of the occupant when the vehicle collides. Since the air bag device 12 is thus arranged in the position offset from the front of the seat center, the space in front of the center of the seat 20 is widened to improve the comfortableness of the vehicle cabin.

Incidentally, the air bag 26 may preferably be equipped therein with straps so that it may be extended in the transversely long shape shown in FIG. 4, as desired.

Although the air bag device 12 is arranged in the foregoing embodiment at the righthand side of the front of the seat 20, it may be disposed at the lefthand side of the front of the seat 20. In the embodiment, the air bag device 12 is disposed on the lower face of the instrument panel 10 but it may be disposed on a dashboard 40.

Another embodiment of the present invention will be described with reference to FIGS. 12 to 14.

Figure 12:
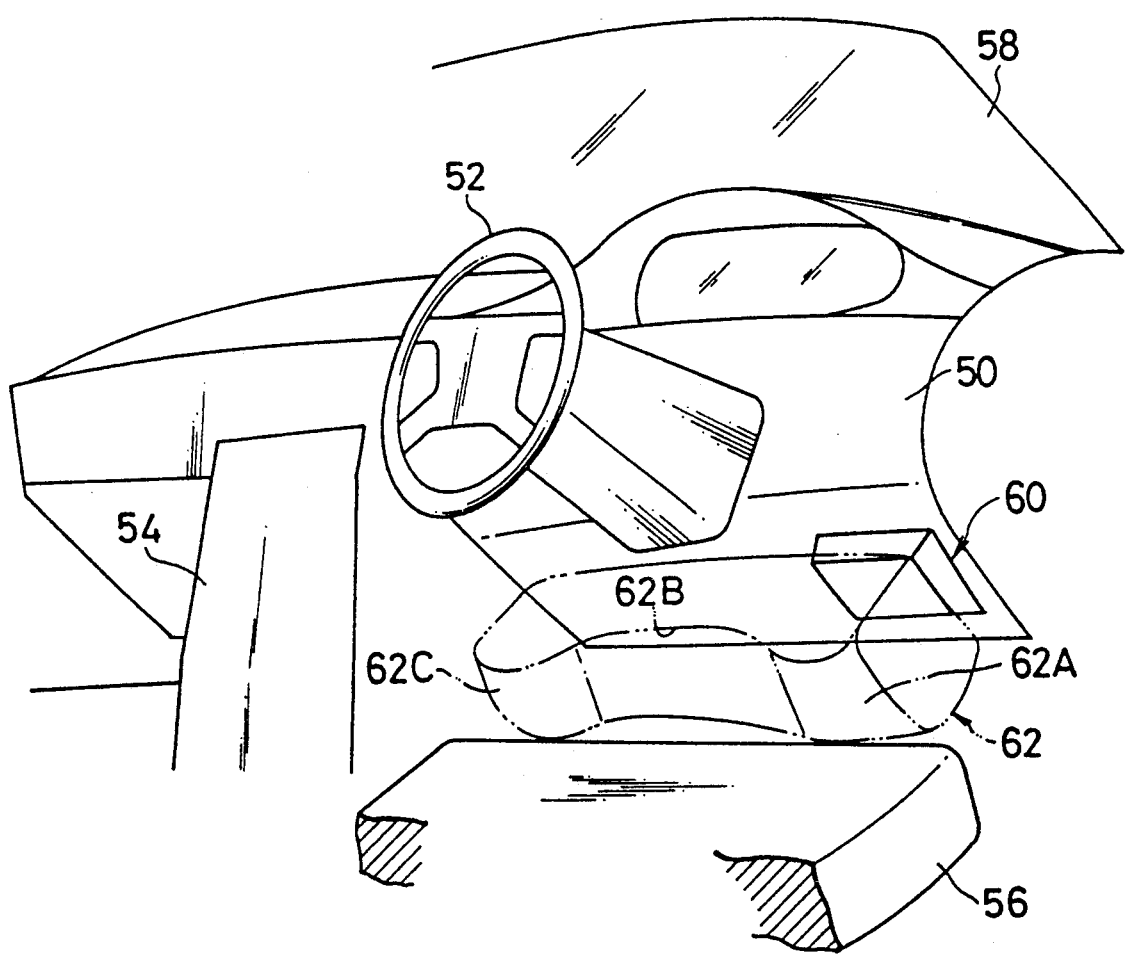
FIG. 12 is a perspective view showing the inside of a vehicle equipped with an air bag device according to another embodiment of the present invention.

In FIG. 12, an instrument panel 50, a steering wheel 52, a console box 54, a seat 56 and a front shield 58 are provided in a cabin of a vehicle. On the lower face of the instrument panel 50, there is mounted an air bag device 60. The air bag device 60 is constructed to have an air bag folded in a casing and to have a gas generating inflater attached to the casing. When the inflater is energized, the air bag is extended to tear the front side of the casing until the air bag 62 is extended to the front of the seat 56.

The air bag device 60 is located in a position offset rightward from the front of the central portion of the seat 56 thereby to leave a wide space around the knees of the occupant seated on the seat 56. Despite of this position, the air bag device 60 may be arranged either in front of the central portion of the seat 56 or at the lefthand side of the front of the center.

Figure 13:
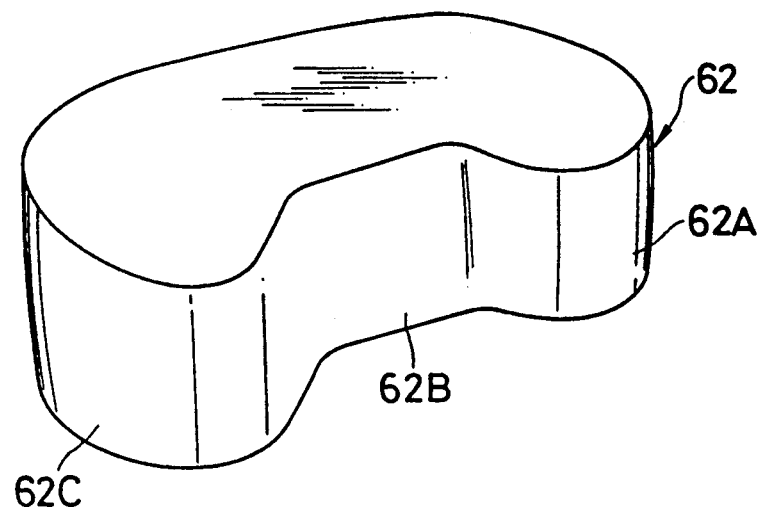
FIG. 13 is a perspective view showing an exploded shape of the air bag of the device of FIG. 12.
Figure 14:
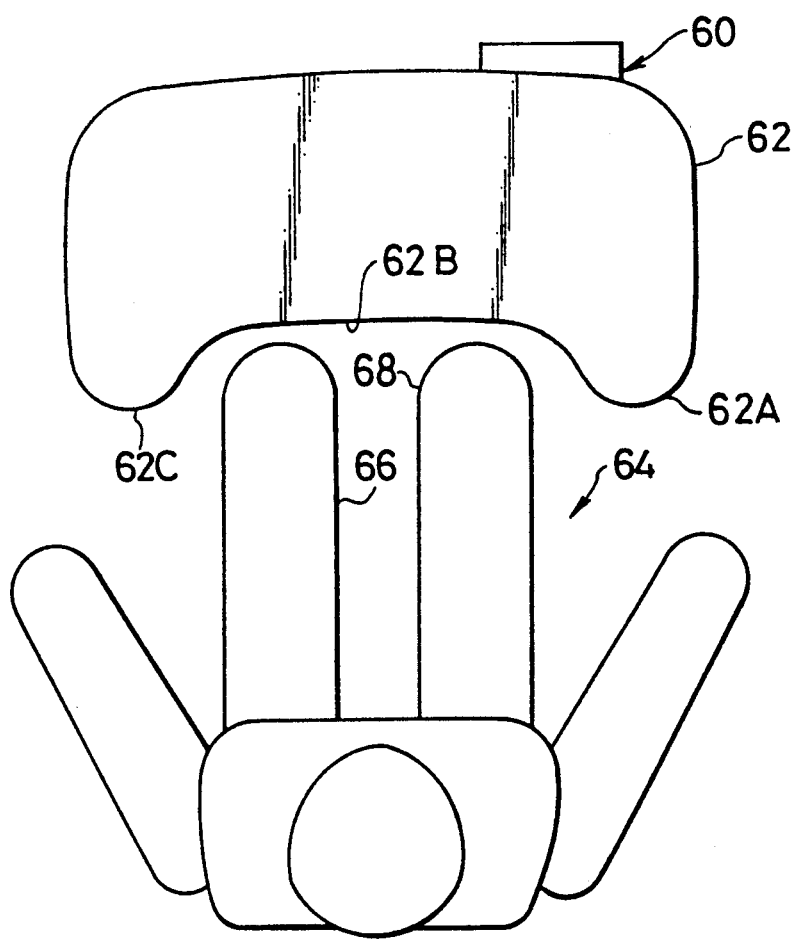
FIG. 14 is a top plane view showing an example of the operation of the device of the embodiment of FIG. 12.

As seen from FIGS. 13 and 14, the air bag 62 is formed at its two ends in the widthwise direction of the seat 56 with projections 62A and 62C projecting toward the seat 56. In other words, the air bag 62 is formed in front of the center portion of the seat 56 with a recess 62B which is recessed apart from the seat 56.

With this air bag extension shape, as seen from FIG. 14, if the knees 66 and 68 of an occupant 64 are thrown toward the air bag 62 at the time of a vehicular collision, they are received by the recess 62B so that they can be prevented from being split to the right and left. Moreover, since the occupant's knees 66 and 68 are held by the air bag 62 without fail, they can be prevented from being thrown to hit the door or the console box 54 of the automobile. It is quite natural that the occupant has its body held and protected without any offset by the center portion of the air bag 62.

According to the present invention, the degrees of restraint upon the lefthand knee 66 and righthand knee 68 of the occupant can be equalized by increasing the volume of the air bag at the vehicle center (i.e., the projection 62C) in which a larger space is provided in the vehicle cabin.

Although the foregoing embodiments exemplify the air bag devices for the driver's seat, the present invention can apparently be applied to an air bag device for a passenger's seat.

According to the air bag device for the knees of an occupant of the present invention, as described above, it is possible to protect the knees of the occupant. Since the air bag device of the present invention is disposed in a position offset rightward or leftward from the front of the seat center, the space around the knees of the occupant of the seat can be widened to improve the comfortableness of the vehicle cabin.

According to the air bag device of the present invention, the air bag has such a high transverse extension rate that it can be quickly extended to the zone in front of the knees of the occupant at an emergency such as collision of the vehicle even if the air bag device is arranged in the position offset from the front of the seat center.

According to the air bag device of the present invention, the occupant can be prevented from having his legs opened when they are thrown to the extended air bag. Moreover, the occupant can have its body held at the center of the air bag.

What is claimed is:

1. An air bag device for a knee of an occupant to be installed in a vehicle, said vehicle having a seat for the occupant and a panel for defining a leg space for the occupant, said air bag device comprising:

a casing attached to the panel offset from a portion facing a center of the seat so that the leg space is not substantially reduced by the casing, a gas generator mounted inside the casing, and an air bag to be retained in the casing, said air bag, when expanded, having an elongated shape to be located in the leg space to prevent the occupant from moving into the leg space and including first and second longitudinal ends opposite to each other, upper and lower side portions situated between the first and second longitudinal ends, a rear portion and a front portion facing the seat, said rear portion having an opening located adjacent to the second longitudinal end and fixed to the casing and the gas generator so that when the gas generator is actuated, the air bag is inflated and extends substantially throughout an entire area of the leg space, said air bag being folded such that the first and second longitudinal ends are turned and folded inwardly, said upper and lower side portions being folded to be located on the front side, a portion having the first longitudinal end being folded back to a surface side and the first longitudinal end being folded to be wound in a same direction, said first and second longitudinal ends being substantially located at respective sides relative to the opening without overlapping with each other to thereby allow the air bag to be inflated smoothly.

2. An air bag device according to claim 1, wherein said air bag further includes front side portions adjacent the first and second longitudinal ends, said front side portions, when the air bag is inflated, projecting toward the seat so that a recess is formed between the front side portions to allow the knee of the occupant to be located in the recess while being surrounded by the front side portions.

3. An air bag device according to claim 2, wherein said upper and lower side portions are substantially flat, the front portion extending substantially perpendicularly to the upper and lower side portions, said air bag being oriented obliquely downwardly from the panel toward the seat when the air bag is inflated.

4. An air bag device for a knee of an occupant to be installed in a vehicle, said vehicle having a seat for the occupant and a panel for defining a leg space for the occupant, said air bag device comprising:
a casing attached to the panel offset from a portion facing a center of the seat so that the leg space is not substantially reduced by the casing,
a gas generator mounted inside the casing, and
an air bag to be retained in the casing, said air bag, when expanded, having an elongated shape to be located in the leg space to prevent the occupant from moving into the leg space and including first and second longitudinal ends opposite to each other, upper and lower side portions situated between the first and second longitudinal ends, a rear portion and a front portion facing the seat, said rear portion having an opening located adjacent to the second longitudinal end and fixed to the casing and the gas generator so that when the gas generator is actuated, the air bag is inflated and extends substantially throughout an entire area of the leg space, said air bag being folded such that the first and second longitudinal ends are turned to be substantially located at respective sides relative to the opening without overlapping with each other to thereby allow the air bag to be inflated smoothly, said air bag further including front side portions adjacent the first and second longitudinal ends, said front side portions, when the air bag is inflated, projecting toward the seat so that a recess is formed between the front side portions to allow the knee of the occupant to be located in the recess while being surrounded by the front side portions, said upper and lower side portions being substantially flat, the front portion extending substantially perpendicularly to the upper and lower side portions, said air bag being oriented obliquely downwardly from the panel when the air bag is inflated.

* * * * *